(12) United States Patent
Tondu

(10) Patent No.: US 12,120,786 B2
(45) Date of Patent: Oct. 15, 2024

(54) ANTI-FROST GLAZING HAVING HEATING POWER DIFFERENTIATED OVER THE ENTIRE SURFACE THERE-OF

(71) Applicant: SAINT-GOBAIN GLASS FRANCE, Courbevoie (FR)

(72) Inventor: Thomas Tondu, Sully (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 813 days.

(21) Appl. No.: 17/277,606

(22) PCT Filed: Sep. 23, 2019

(86) PCT No.: PCT/FR2019/052218
§ 371 (c)(1),
(2) Date: Mar. 18, 2021

(87) PCT Pub. No.: WO2020/065187
PCT Pub. Date: Apr. 2, 2020

(65) Prior Publication Data
US 2022/0039215 A1    Feb. 3, 2022

(30) Foreign Application Priority Data
Sep. 28, 2018   (FR) ....................................... 1858979

(51) Int. Cl.
*H05B 3/84*   (2006.01)
*B64D 15/14*   (2006.01)

(52) U.S. Cl.
CPC ............... *H05B 3/84* (2013.01); *B64D 15/14* (2013.01); *H05B 2203/037* (2013.01)

(58) Field of Classification Search
CPC ................ H05B 3/84; H05B 2203/013; H05B 2203/005; H05B 2203/011; H05B 2203/014; H05B 2203/031; H05B 2203/037; H05B 1/0236; H05B 2214/04; B32B 17/10036; H01Q 1/1278;
(Continued)

(56) References Cited

U.S. PATENT DOCUMENTS 3,288,983 A * 11/1966 Lear, Sr. .................. H05B 3/86
219/203
9,301,343 B2 * 3/2016 Ishizeki ............ B32B 17/10385
(Continued)

FOREIGN PATENT DOCUMENTS

EP   0 395 301 A2   10/1990
EP   0 893 938 A1   1/1999
(Continued)

OTHER PUBLICATIONS

International Search Report as issued in International Patent Application No. PCT/FR2019/052218, dated Dec. 17, 2019.

*Primary Examiner* — Shawntina T Fuqua
(74) *Attorney, Agent, or Firm* — Pillsbury Winthrop Shaw Pittman LLP

(57) ABSTRACT

An anti-icing glazing or portion thereof, is entirely located, in the fitted position, on one side of the plane of symmetry of the body of an airborne, water-borne or terrestrial vehicle, wherein the heating power is differentiated over the whole of the surface thereof, so as to apply the maximum power to the portion of the surface where the heat loss is maximum.

11 Claims, 1 Drawing Sheet

(58) Field of Classification Search
CPC ... H01Q 1/12; B60S 1/026; B60H 1/00; B60J 1/002; B60R 16/03; B64D 15/14
See application file for complete search history.

(56) References Cited

U.S. PATENT DOCUMENTS

| | | | |
|---|---|---|---|
| 2010/0159251 A1* | 6/2010 | Brandt | H05B 3/84 219/121.72 |
| 2015/0076137 A1* | 3/2015 | Kim, II | H05B 3/20 977/788 |
| 2016/0325529 A1* | 11/2016 | Linthout | B60Q 3/208 |
| 2023/0105516 A1* | 4/2023 | Seo | H05B 1/0236 219/203 |

FOREIGN PATENT DOCUMENTS

| | | |
|---|---|---|
| FR | 2 888 082 A1 | 1/2007 |
| WO | WO 2017/001792 A1 | 1/2017 |
| WO | WO 2018/109364 A1 | 6/2018 |

* cited by examiner

ANTI-FROST GLAZING HAVING HEATING POWER DIFFERENTIATED OVER THE ENTIRE SURFACE THERE-OF

CROSS-REFERENCE TO RELATED APPLICATIONS

This application is the U.S. National Stage of PCT/FR2019/052218, filed Sep. 23, 2019, which in turn claims priority to French patent application number 1858979 filed Sep. 28, 2018. The content of these applications are incorporated herein by reference in their entireties.

FIELD

The invention relates to an anti-icing glazing as used in aeronautics, the marine industry or the railroad industry in particular.

BACKGROUND

Airborne, water-borne or terrestrial vehicles operating in icy conditions are equipped with heating systems integrated in the glazings and that make it possible to prevent the appearance of ice by collection then icing of supercooled water droplets. The heating makes it possible to maintain the temperature of the outer skin of the glazing above 0° C. and to keep the water in liquid form. The latter is then either driven off by the airflow or evaporated. The heating is obtained by the Joule effect by circulation of an electric current either in a transparent conductive layer, or in wires that are thin enough not to disrupt the vision. The resistive elements are located on the inner skin of the laminated glazings that is closest to the outer surface, i.e. on the face inside the laminated structure of the glass sheet of the laminate which is in contact with the outside atmosphere.

Aeronautical regulations for example (in particular CS25: "Certification Specification for Large Airplanes" as specified by the European aeronautical authorities EASA for large commercial aircraft, business jets, airliners, equivalent to FAR 25 issued by the FAA, the United States authority) indicate that a specific heating power of 7 kW/m$^2$ makes it possible to ensure clear vision at any time. Thus, it is common practice to apply this power, targeting the most perfect possible homogeneity.

The windshields of aircraft, water-borne vehicles or terrestrial vehicles, in particular high-speed vehicles, are tending toward being increasingly large owing to the reduction in the number of glazings and owing to the improvement in aerodynamic performance requiring glazings that are less and less vertical. Since the angular aperture is imposed, this leads to an increase in the surface area of the glazings. The electrical power allotted to the glazings is consequently increasing and may under certain flight conditions be the primary power-consuming item.

Reducing the electrical power consumed by the glazings may make it possible to reduce the weight of the electrical backup and electrical power generation systems, and also the consumption of kerosene or any other fuel.

SUMMARY

To this end, one subject of the invention is an anti-icing glazing or portion thereof, entirely located, in the fitted position, on one side of the plane of symmetry of the body of an airborne, water-borne or terrestrial vehicle, characterized in that the heating power is differentiated over the whole of the surface thereof, so as to apply the maximum power to the portion of the surface where the heat loss is maximum. This glazing provides an intentionally heterogeneous heating and, consequently, a possibility of reducing the energy for the de-icing and of lightening the electrical power generation means.

To simplify, according to the invention a glazing or else a portion thereof is only considered of a single side of the plane of symmetry of the vehicle. But of course, the invention relates to all of the anti-icing glazings thereof. The glazings of a vehicle may not be positioned symmetrically, i.e. may not be the mirror image of one another in pairs relative to the plane of symmetry of the body; but in general they are so. Thus, in this case of symmetrical positioning of the glazings for example, an aircraft cockpit may have one, two or three glazings with an anti-icing function. The general definition of the invention then relates, for reasons of symmetry, to only one half of the frontal glazing, respectively to only one of the two lateral glazings, respectively to only one half of the frontal glazing and that of the two lateral glazings positioned on the same side of the plane of symmetry of the body.

According to preferred features of the anti-icing glazing or portion thereof of the invention:

said portion of the surface where the heat loss is maximum is the bottom portion of the glazing which is subjected to greater collection of water than the rest of the glazing; this more sizeable collection leads to a greater need for power in order to heat the water above zero degrees Celsius and more power required by the evaporation thereof;

the envelope of the anti-icing glazing or of the portion thereof is defined by the quadrilateral ABCD, AB being the tangent to the middle of the upper post of the glazing or the portion thereof, BC the tangent to the middle of the rear post thereof, CD the tangent to the middle of the lower post thereof and DA the tangent to the middle of the front post thereof, optionally included in the plane of symmetry of the body of the vehicle, E and G being the middles of the segments DA, respectively BC, F being any point on the segment EG, characterized in that the mean specific heating powers are 7, respectively 4, respectively 4, each to within ±1 kW/m$^2$, in the surface areas delimited by the points CDEF, respectively ABGE, respectively CFG; it is thus possible to obtain a drop in power of up to around 30% relative to a glazing entirely heated at 7 kW/m$^2$; the unheated surfaces (edge effects) are not taken into account in the calculation of the mean powers; this definition does not exclude a possible curvature of the anti-icing glazing: if the tangents are not coplanar-secant, they must be projected orthogonally to a plane perpendicular to the normal to the glazing (or to the portion-half thereof), at the barycenter thereof;

the differentiated heating power is obtained by the deposition of a transparent electrically conductive layer of heterogeneous thickness that makes it possible to adjust the power dissipated;

the anti-icing glazing or portion thereof comprises a transparent electrically conductive layer from which fine flow-separating lines have been removed by ablation, so as to help to control the distribution of differentiated heating power; these flow-separating lines, often referred to as flow lines, are obtained by laser ablation mainly; they are described in applications WO 2017/001792 A1, FR 2 888 082 A1, EP 0 893 938 A1 and WO 2018/109364 A1 and have the role of guiding the electric current, or even in certain cases of isolating certain non-conductive zones by means of lines that are closed on themselves;

the transparent electrically conductive layer comprises at least one transparent conductive oxide such as tin-doped indium oxide (Indium Tin Oxide—ITO), fluorine-doped tin oxide $SnO_2{:}F$ and/or at least one metal such as silver, in particular in the form of a multilayer stack containing silver;

the anti-icing glazing or portion thereof consists of a laminated glazing, of which the face inside the laminated structure of the glass sheet of the laminate which, in the fitted position, is in contact with the outside atmosphere, bears resistive electrically conductive elements; it may be a transparent electrically conductive layer and/or a network of heating wires; the sheets constituting the laminated glazing may be made of mineral glass, such as soda-lime glass which is optionally thermally tempered, aluminosilicate glass which is optionally chemically tempered, or other mineral glass, or else they are organic of poly(methyl methacrylate) (PMMA), polycarbonate (PC) or ionomer resin type, and are joined to one another by means of an adhesive interlayer of polyvinyl butyral (PVB), polyurethane (PU) or ethylene-vinyl acetate (EVA) type for example; the laminated glazing may have a structure that provides ballistic resistance, may have shielding functions with respect to electromagnetic radiation, antistatic functions of dissipating/discharging electrostatic charges, and its outer surfaces may be hydrophilic, hydrophobic, anti-soiling—photocatalytic.

Another subject of the invention is the application of the anti-icing glazing or portion thereof defined above in aeronautics, the marine industry or the railroad industry, for example as frontal or lateral windshield of an aircraft cockpit, a windshield of a boat or of a train in particular a high-speed one.

BRIEF DESCRIPTION OF THE DRAWINGS

The invention will be better understood in light of the following description of the appended drawings, in which.

DETAILED DESCRIPTION

Figure 1:
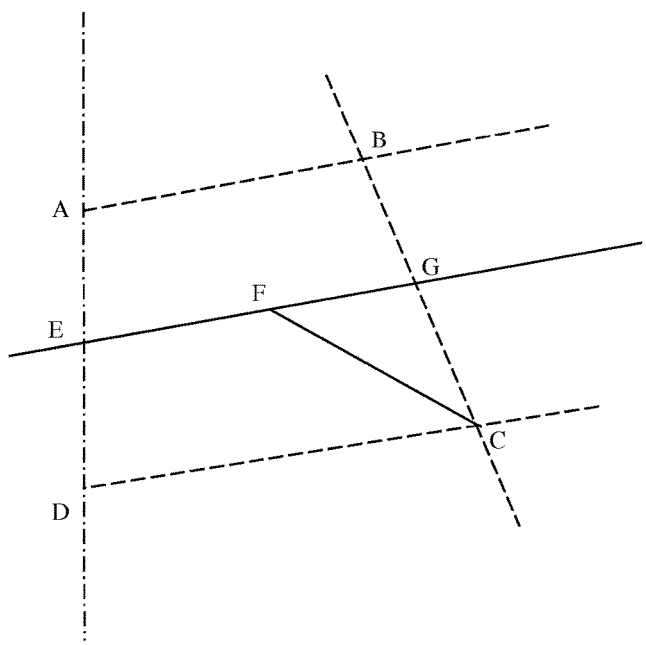
FIG. 1 represents the quadrilateral characteristic of one half of anti-icing glazing, and the delimitation of zones in accordance with one particular embodiment of the invention.

With reference to FIG. 1, a frontal glazing of an aircraft cockpit is centered with respect to the cabin of the aircraft, i.e. with respect to the plane of symmetry thereof. For reasons of symmetry, it is sufficient here to represent only the right half, as front view of the aircraft in the fitted position, of the frontal windshield, which half is positioned on a single right-hand side of the plane of symmetry of the cabin. This cockpit may furthermore comprise two lateral windshields on either side of the frontal windshield.

The frontal windshield has an anti-icing function by means of a transparent electrically conductive layer borne by the face oriented toward the inside of the laminated structure of the glass sheet in contact with the outside atmosphere.

The envelope of this right half of the frontal windshield is defined by the quadrilateral ABCD, AB being the tangent to the middle of the upper post of the right half of the glazing, BC the tangent to the middle of the rear post thereof, CD the tangent to the middle of the lower post thereof and DA the tangent to the middle of the front post thereof, which is included here in the plane of symmetry of the cabin. E and G are the middles of the segments DA, respectively BC, and F is any point on the segment EG.

Figure 2:
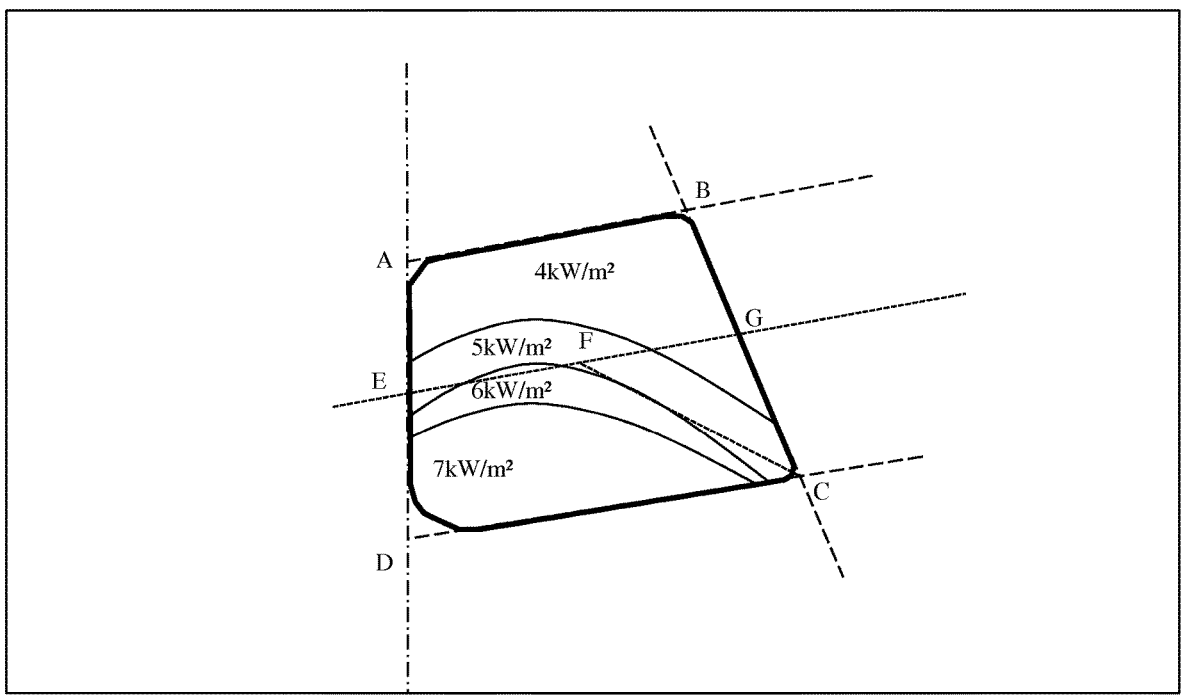
FIG. 2 represents a quadrilateral analogous to that of FIG. 1, superposed on which are zones of different mean specific heating powers.

With reference to FIG. 2, in accordance with the invention, mean specific heating powers are indeed 7, respectively 4, respectively 4, each to within ±1 $kW/m^2$, in the surface areas delimited by the points CDEF, respectively ABGE, respectively CFG.

The invention claimed is:

1. An anti-icing glazing or portion thereof, entirely located, in a fitted position, on one side of a plane of symmetry of a body of an airborne, water-borne or terrestrial vehicle, wherein a heating power is differentiated over the whole of a surface thereof, so as to apply a maximum power to the portion of the surface where a heat loss is maximum, wherein an envelope of the anti-icing glazing or portion thereof is defined by a quadrilateral ABCD, AB being a tangent to a middle of an upper post of the glazing or the portion thereof, BC a tangent to a middle of a rear post thereof, CD a tangent to a middle of a lower post thereof and DA a tangent to a middle of a front post thereof, optionally included in the plane of symmetry of the body of the vehicle, E and G being the middles of the segments DA, respectively BC, F being any point on the segment EG, wherein a mean specific heating power of a surface area delimited by the points CDEF is greater than (i) a mean specific heating power of a surface area delimited by the points ABGE and (ii) a mean specific heating power of a surface area delimited by the points CFG.

2. The anti-icing glazing or portion thereof as claimed in claim 1, wherein said portion of the surface where the heat loss is maximum is a bottom portion of the glazing which is subjected to greater collection of water than the rest of the glazing.

3. The anti-icing glazing or portion thereof as claimed in claim 1, wherein the mean specific heating powers of the surface area delimited by the points CDEF is 7±1 $kW/m^2$, the mean specific heating power of the surface area delimited by the points ABGE is 4±1 $kW/m^2$, and the mean specific heating power of the surface area delimited by the points CFG is 4±1 $kW/m^2$.

4. The anti-icing glazing or portion thereof as claimed in claim 1, wherein a differentiated heating power is obtained by a deposition of a transparent electrically conductive layer of heterogeneous thickness to adjust a power dissipated.

5. The anti-icing glazing or portion thereof as claimed in claim 1, further comprising a transparent electrically conductive layer from which fine flow-separating lines have been removed by ablation, so as to help to control a distribution of differentiated heating power.

6. The anti-icing glazing or portion thereof as claimed in claim 5, wherein the transparent electrically conductive layer comprises at least one transparent conductive oxide and/or at least one metal.

7. The anti-icing glazing or portion thereof as claimed in claim 1, wherein the anti-icing glazing is a laminated glazing including a laminated structure, of which a face inside the laminated structure of the glass sheet of the laminated glazing which, in the fitted position, is in contact with the outside atmosphere, bears resistive electrically conductive elements.

8. A method comprising utilizing an anti-icing glazing or portion thereof as claimed in claim 1 in an airborne, waterborne or terrestrial vehicle.

9. The anti-icing glazing or portion thereof as claimed in claim 6, wherein the at least one transparent conductive oxide is tin-doped indium oxide (Indium Tin Oxide—ITO) or fluorine-doped tin oxide $SnO_2$:F.

10. The anti-icing glazing or portion thereof as claimed in claim 6, wherein the at least one metal is silver.

11. The anti-icing glazing or portion thereof as claimed in claim 1, wherein a difference between the mean specific heating power of the surface area delimited by the points CDEF and each of the mean specific heating power of the surface area delimited by the points ABGE and the surface area delimited by the points CFG is up to 30%.

\* \* \* \* \*